United States Patent

[11] 3,593,870

| [72] | Inventor | Douglas W. Anderson<br>Palatine, Ill. |
|---|---|---|
| [21] | Appl. No. | 795,891 |
| [22] | Filed | Feb. 3, 1969 |
| [45] | Patented | July 20, 1971 |
| [73] | Assignee | Dave Chapman, Goldsmith & Yamasaki, Inc.<br>Chicago, Ill. |

[54] CLOSURE FOR FLUID CONTAINER
4 Claims, 5 Drawing Figs.

[52] U.S. Cl. .................................. 215/11 B, 215/11 C
[51] Int. Cl. .................................. A61j 11/02
[50] Field of Search .......................... 215/11, 11.1, 11.2, 11.3, 11.4

[56] References Cited
UNITED STATES PATENTS

| 2,616,581 | 11/1952 | Madsen | 215/11.2 |
| 2,694,500 | 11/1954 | White | 215/11 |
| 2,741,385 | 4/1956 | Raiche | 215/11 |
| 2,982,432 | 5/1961 | Mehl | 215/11 |
| 3,358,864 | 12/1967 | Meierhoefer | 215/11.2 UX |
| 3,393,817 | 7/1968 | Meierhoefer | 215/11.2 |
| 3,394,018 | 7/1968 | Velonis | 215/11.3 UX |
| 3,432,059 | 3/1969 | Stephens | 215/11.3 |

*Primary Examiner*—Donald F. Norton
*Attorney*—Fidler, Bradley, Patnaude & Lazo

ABSTRACT: The closure for the liquid container is formed by injection molding a first layer of a hard plastic having first and second inwardly projecting cones, and after it sets, injection molding a second layer of an elastomeric plastic directly against the first layer so that the first layer forms a replaceable cap for the second layer after being removed from the mold. The second layer is molded about a male mold part having screw threads about its shank and a boss abutting the first cone with an elongated crevice adjacent thereto. The screw thread of the second layer deforms to permit the closure to be pulled free from the mold. The crevice and first cone form an elastomeric flap and valve opening comprising a check valve and the second cone forms a liquid outlet.

PATENTED JUL20 1971 3,593,870
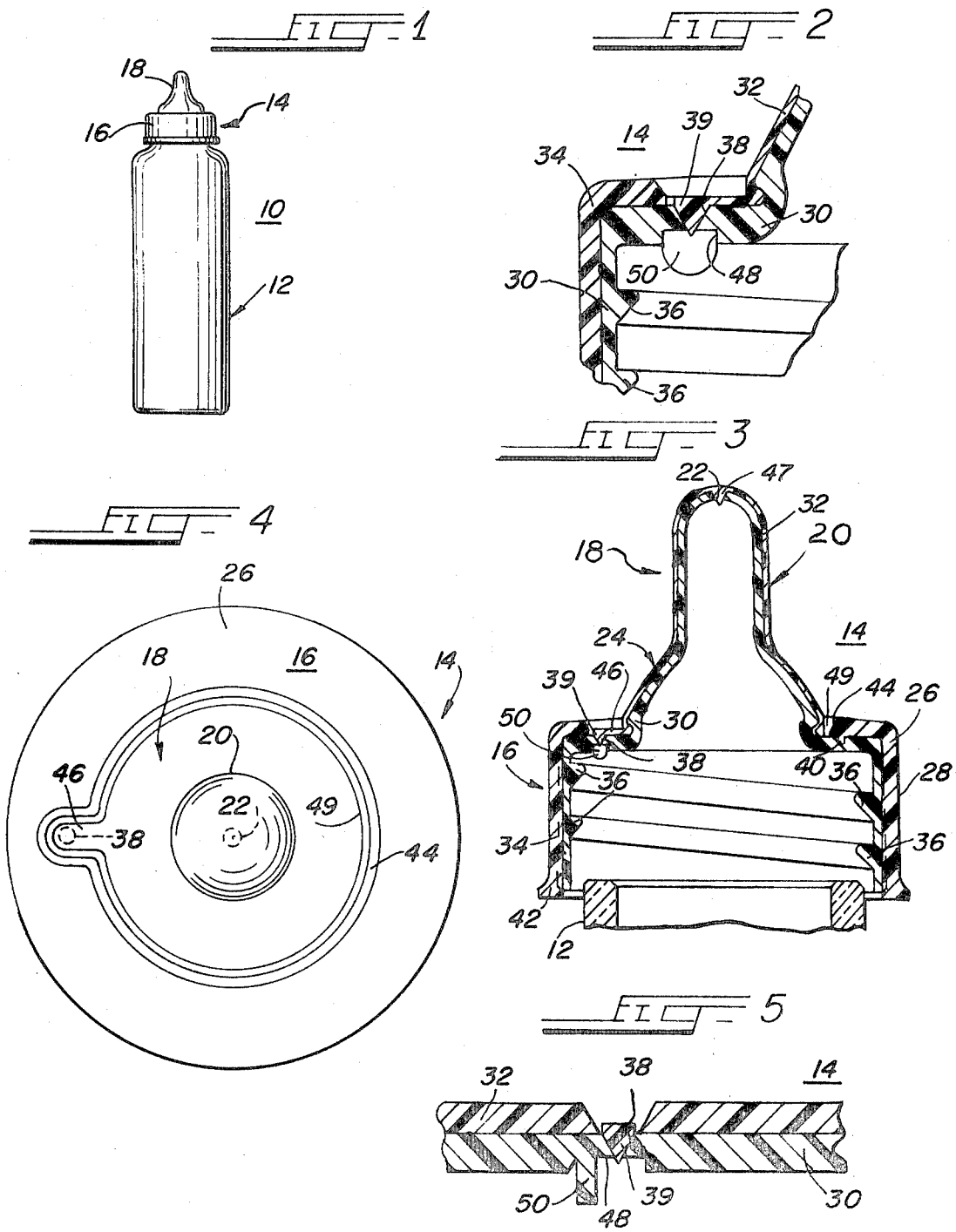
INVENTOR.
DOUGLAS W. ANDERSON
BY Fidler, Bradley & Patmore
ATTYS

CLOSURE FOR FLUID CONTAINER

This invention relates to containers for liquids and more particularly relates to closures for such containers and to methods of making such closures.

Noncollapsible containers for liquids include a receptacle such as a bottle and a closure for the receptacle, which closure is removably mounted to the receptacle by a fastener such as mating screw threads on the receptacle and closure. These containers also include an air inlet through which air flows to replace the liquid leaving the container.

One type of such container includes an outlet for the liquid in the closure for the container. For example, nursing containers include a bottle for holding the liquid that is to be fed to the infant and a closure that includes a nursing nipple through which the liquid is fed to the infant. These nursing containers include an air inlet through which air flows to replace the liquid as it is withdrawn by the infant. The neck of the bottle includes external threads and the closure of the bottle includes matching internal threads which hold the closure to the bottle.

In one type of prior art container, screw threads or other fastener for the receptacle of the container fit loosely with corresponding screw threads or other fastener of the closure to permit air to flow into the container to replace the liquid withdrawn from the container through the closure. One technique for forming the internal screw threads or other fastener of the closure is to expand a mandrel having external surfaces shaped as screw threads or other fastener surfaces of the fastener against the inside of the closure while the closure is being molded to shape the surfaces of the fastener therein. The mandrel is then collapsed and withdrawn.

The prior art containers of this type have a disadvantage in that it is difficult to adjust the closure to provide the proper size air inlet around the threads or other fastener for the rate that the liquid is to be withdrawn from the container. For example, it is difficult to properly adjust the closure of a nursing container for an infant because the infant does not withdraw the liquid from the nursing container at a steady predictable rate. Moreover, the screw threads that have been partially unscrewed to permit air to enter may also permit liquid to flow between the threads and out of the nursing container.

This method of manufacturing the internal screw thread in the closure of such a container has a disadvantage in that the mandrel used as the male mold part for forming the internal thread is expensive. Moreover, the process is time consuming and this further increases the cost of such a closure.

Accordingly, it is an object of this invention to provide a novel container for liquids.

It is a still further object of the invention to provide a novel method for making an internal screw thread.

It is a still further object of this invention to provide a novel value.

It is a still further object of the invention to provide a novel method for manufacturing a valve.

It is a still further object of this invention to provide a novel closure and method of manufacturing a closure for a container.

It is a still further object of this invention to provide a novel nursing container and process for making the nursing container.

It is a still further object of the invention to provide a novel closure for a nursing container and a method of making the closure.

In accordance with the above and further objects of the invention, plastic is injected into a mold cavity formed by a female mold part having an interior surface with the same shape as the exterior of the closure to be formed and a male mold part with two conical cavities therein. The plastic is permitted to harden in the mold cavity to form a shell having first and second inwardly extending cones. The male mold part is then removed and replaced with a second male mold part having screw threads around a shank portion and a boss abutting the first downwardly extending cone with an elongated inwardly extending cavity.

An elastomeric plastic material is injected into the mold to form a second layer internal of the first plastic layer. This second layer is molded to be releasable from the first layer. It forms an internal screw thread about the male mold part, a valve opening around the first cone, an elastomeric elongated flap that serves as a check valve extending downwardly adjacent to the valve opening and an outlet around the second cone.

The resulting two-layer plastic closure is removable from the male mold part without unscrewing because the internal thread in the elastomeric internal layer deforms to permit the closure to be pulled free from the thread on the male mold part. When screwed onto the neck of a receptacle, the receptacle is sealed by the closure.

The releasable outer layer serves as a protective cap that is pulled from the inner layer to remove the first cone from the valve opening and the second cone from the outlet. When the closure is screwed onto the receptacle of the container, the downwardly extending flap of elastomeric material is bent upward to close the valve opening formed by the removal of the first cone from the elastomeric layer. This valve opening and flap form a check valve that permits air to enter into the container through the elastomeric layer of the closure by bending the elastomeric flap inwardly but prevents liquid from flowing out of the valve opening by forcing the flap against the elastomeric layer surrounding the valve opening and defining a valve seat.

The invention and the above-noted and other features thereof will be better understood from the following detailed description when considered with reference to the accompanying drawings, in which:

FIG. 1 is an elevational view of a nursing container which includes an embodiment of the invention;

FIG. 2 is an enlarged fragmentary view, in section, showing a portion of a closure for the nursing container of FIG. 1 in one stage of its manufacturing;

FIG. 3 is an enlarged fragmentary sectional view of the closure of the nursing container shown in FIG. 1;

FIG. 4 is a plan view of the nursing container shown in FIG. 1; and

FIG. 5 is an enlarged fragmentary view, in section, of a valve used in the nursing container shown in FIG. 1.

STRUCTURE OF CLOSURE

In FIG. 1, a nursing container 10 is shown in an elevational view having a bottle 12 sealed with a closure 14 at its upper end. The closure 14 includes a shank portion 16 having an internal screw thread that engages a corresponding screw thread on the neck of the bottle 12 and a nipple 18 extending upwardly from the shank portion 16 and having an outlet 22 (FIGS. 3 and 4) for the nursing container 10.

As best shown in FIGS. 3 and 4, the nipple 18 includes a narrow diameter upper portion 20 with the outlet 22 being centrally located at its distal end and a lower portion 24 in the form of a truncated cone joining the bottom of the upper portion 20 and sloping outward to a shoulder 26 of the shank portion 16. The shank portion 16 includes cylindrical sidewall 28 extending downwardly from the shoulder 26.

The closure 14, as best shown in FIG. 3, is formed in two layers with three sections of plastic, which are: (1) an inner layer 30 of an elastomeric material: (2) a removable cap 32 which fits conformably over the inner layer 30 about the nipple 18 and is removable therefrom to expose the outlet 22; and (3) a protective side portion 34 which fits conformably over the inner layer 30 about the shank 16 of the closure 14.

To permit the closure 14 to be screwed to the neck of the bottle 12, the inner layer 30 includes a plurality of buttress threads 36 molded into its internal sides for engagement with the external threads of the neck of the bottle 12 of the nursing container 10. The inner layer 30 also includes an aperture at the top of the nipple 18 to provide the outlet 22 for the liquid and a valve opening 38 on its shoulder portion 26 to permit air to enter the nursing container 10 as the liquid is withdrawn through the outlet 22. On its outer surface adjacent to the protective side portion 34, the inner layer 30 includes one or more notches shown at 40 in FIG. 3, which notches 40 confine complementarily formed portions in the protective side portion 34 of the closure 14 to hold it thereon.

As best shown in FIGS. 2 and 5, the inner layer 30 includes a recess 48 and a flat downwardly extending flap 50 of such a length and width as to fit within the recess 48 when folded over against it. This flap, when folded tightly into the recess 48, closes the valve opening 38. Both the valve opening 38 and the flap 50 are located above the externally threaded neck of the bottle 12 of the nursing container 10 so that the flap 50 is folded into the compartment 48 when the closure 14 is screwed onto the neck of the bottle 12 of the nursing container 10.

The inner layer 30 is a thermoplastic elastomeric material such as a copolymer of styrene and butadiene sold by Shell Oil Company under the trade name "Pharos."

The protective side portion 34 includes a flat bottom surface 42 which is perpendicular to the cylindrical sidewalls 28 of the closure 14 and forms a surface to which a sealing foil is attached to permit the closure 14 to be easily packaged in a separate sterile container for later use. Extending upwardly from the flat bottom portion 42 of the protective side portion 34 is a cylindrical wall portion forming part of the cylindrical sidewall 28 of the closure 14 and an integrally formed annular portion extending inwardly to form the outer layer of the shoulder 26. The annular portion forming the outer layer of the shoulder 26 includes a beveled edge 44 extending annularly for a portion of a circle and then extending into the shoulder portion 26 to form an elongated slot opening downwardly to a valve opening 38 in the inner layer 30 of the closure 14, which slot accommodates a complementarily formed arm 46 of the removable cap 32.

The removable cap 32 forms a part of and conforms in shape to the upper and bottom portions 20 and 24 of the nipple 18 and includes four main portions, which are: (1) an annular portion at its base forming a part of the shoulder 26; (2) an arm 46 that extends radially into the shoulder 26 from the annular portion; (3) an upper nipple portion of a small diameter forming the outer layer of the upper nipple 20; and (4) a lower sloping portion of a larger diameter forming the outer layer of the lower nipple 24. The annular portion and the arm 46 are separated from the protective side portion 34 by a groove 49. On its bottom or inner surface, the removable cap 32 includes a first cone 39 that extends downwardly from the radially extending arm into the valve opening 38 and a second cone 47 that extends from the tip of the removable cap 32 into the outlet 22 of the inner member 30 to close both the valve opening 38 and the outlet 22 while the removable cap 32 is in place.

PROCESS OF MANUFACTURING

In the process of manufacturing closures such as the closure 14, a plurality of closures 14 are molded together in a multiple cavity injection molding apparatus such as that described in the patent application to Eugene D. Shastal, U.S. Ser. No. 752,711, filed Aug. 14, 1968 for "Injection Molding Process." With such an apparatus, the first injection of two injections is of a plastic material that results in a relatively hard plastic shell when set. Polypropylene is a suitable material.

This plastic is injected into a mold cavity formed from a female mold part having internal walls with a surface that has the same shape as the outer surface of the closure and a male mold part having an external surface with a shape similar to the shape of the external surface of the inner layer 30 of the closure. The female mold part includes a separating wall between the portion of the cavity that forms the replaceable cap 32 and the portion that forms the protective shank 34, which separating wall forms the separating groove 49 between the cap 32 and the protective shank 34 in the closure 14. The male mold part includes two conical recesses to form the inwardly extending cones 39 and 47 and a ridge or bead shown at 40 in FIG. 3.

This first injection forms the hard removable cap 32 and the protective shank 34 of the closure 14.

After the polypropylene has set, the male mold part is removed and replaced by a different male mold part having an external surface shape similar to the internal surface of the inner layer 30 of the closure 14. The external surface of the mold part includes buttress threads along its sides to form the internal screw thread 36 of the inner layer 30 and includes at its top an upwardly extending rectangular boss to form the recess 48 and an elongated rectangular cavity adjacent to the boss to form the flap 50. A second shot of flexible plastic such as the aforementioned "Pharos" is inserted into this new mold cavity against the hardened polypropylene and permitted to set. The finished article is then ejected.

The downwardly extending cone 47 forms the outlet 22 through the inner layer 30 and the downwardly extending cone 39 forms the valve opening 38. The rectangular cavity in the male mold part forms the flap 50 which serves as the valve member that fits into the depression or valve seat 48. The protective side portion 34 is held to the inner portion 30 of the closure 14 by the undercut portion 40.

The removable cap 32 of the closure 14 is releasable from the inner layer 30. This is accomplished because the polypropylene has a higher melting point than the copolymer of styrene and butadiene forming the inner layer 30 and the copolymer of styrene and butadiene is molded at a temperature below the melting point of the polypropylene. If it is desired to use different materials not having appropriate melting points for the inner layer 30 and the removable cap 32, a silicone releasing agent is applied to the inner surface of the replaceable cap 32 to permit the inner layer 30 to be releasable therefrom.

It can be seen that the closure 14 is economically made in quantity by a two-shot injection process using multiple cavity molds. By using the outer layer which forms the removable cap 32 and the protective side portion 34 as a mold part for molding the inner layer 30 in the injection molding process, the cost is further reduced. This permits the valve opening 38, valve seat 48 and valve member 50 to be economically manufactured. Moreover, because the pins 47 and 39 in the removable cap serve as core members to form the outlet 22 and valve opening 38, the number of closures that are faulty because of the absence of valve openings is reduced. Such a fault generally occurs because of the breakage of a core pin that is to form the valve opening. However, a new core pin is provided for each closure in the method of this invention through the use of the cone 39 as part of the female mold part in the molding operation.

The caps may be separately packaged in sterile containers to be used as needed. The flat surfaces of 42 are adapted to receive a sealing foil to close the package that includes the closure 10.

USE OF THE CLOSURE

To use the closure 14 on a nursing container 10, the closure 14 is removed from its sealed package and screwed onto the threaded neck of the noncollapsible bottle 12 of the nursing container 10. As it is threaded in place, the valve member 50 (FIGS. 2, 3 and 5) is forced into the valve seat 48 (FIG. 5) by the top edge of the neck of the bottle 12 of the nursing container 10. The flap 50 fits loosely against the valve seat 48.

Before the nursing container is used to feed an infant, the removable cap 22 is pulled free to remove the cone 47 from the outlet 22 of the nipple 18 and the cone 39 from the valve opening 38. Since the inner layer 30 is hot during molding, the inner surface between the removable cap 22 and the inner layer 30 is sterilized and the tight fit between these two parts preserves this aseptic condition until the removable cap 22 is removed to expose the inner layer 30 and to permit use of the nipple 18.

During use of the nipple 18, the liquid flows from the nursing container 10 through the outlet 22 and is replaced at the same time by air flowing into the nursing container 10 through the valve opening 38. As the air flows through the valve opening 38, it forces the loosely fitting flap 50 inwardly. However, when liquid is not being withdrawn from the nursing container 10 through the outlet 22, the liquid forces the valve member 50 tightly against the valve seat 48 to prevent the liquid from flowing through the valve opening 38.

In summary, the valve operates to permit air to enter the noncollapsible bottle 12 as the liquid is removed and to prevent the liquid from flowing through the valve opening when the bottle is in any position, and more specifically: (1) while the bottle is inverted and liquid is being withdrawn from the bottle 12 through the outlet 22 of the nipple 18, the vacuum created within the bottle by the removal of the liquid and by the pulling upon the nipple 18 causes the valve member 50 to open so that air enters through the valve opening 38 and the liquid is prevented from passing through the valve opening by the vacuum within the bottle; (2) while the bottle is inverted and liquid is not being withdrawn from the bottle, the weight of the liquid within the bottle forces the valve member 50 tightly against the valve seat 48 so that the liquid does not flow through the valve opening 38; (3) while the bottle is in an upright position and liquid is withdrawn from the outlet 22, air enters the bottle through the valve opening 38 to replace the liquid being removed since the valve member 50 is biased open against the bottle by the elastomeric material of which it is formed and liquid is prevented from flowing through the valve opening by gravity; and (4) while the bottle is upright and no liquid is being removed from the bottle, the valve member 50 is biased against the bottle to open the valve opening 38 but, since there is no pressure within the bottle, air does not enter and liquid does not leave.

The removable cap 32 may be reinserted onto the inner layer 30 at any time to close the valve opening 38 with the cone 39 and the outlet 22 with the cone 47.

It can be understood that the check valve, besides being economically fabricated, enables the nursing container 10 to be used with convenience. Since it is a check valve, it does not need adjustment in size to permit the proper amount of air to enter but air enters in the proper amount as the liquid is withdrawn. Moreover, because it is a check valve, the liquid cannot escape out of the nursing container through the valve opening 38.

The buttress thread 36 forms a tight seal with the screw thread of the neck of the bottle 12 of the nursing container 10. It does not have to be adjusted in tightness to provide an inlet since the air inlet is provided through the valve opening 38 by the check valve. The thread 36 is economically fabricated because it is formed on a simple male mold part and then the finished article is pulled free from the mold part member rather than being formed by a mandrel that expands to form the threads and contracts to be removed. When the finished closure 14 is pulled free from the mandrel, the thread 36 deform to permit the closure 14 to be removed without unthreading if desired. This increases the speed of the operation and further reduces the cost of the closures.

Although a specific embodiment of the invention has been described with a certain degree of particularity, many modifications and variations are possible in the embodiment in view of the above teachings. It is therefore to be understood that, within the scope of the appended claims, the invention may be practiced otherwise than as specifically described.

What I claim is:

1. A combination of a check valve and a closure for a fluid container comprising:
   first and second portions;
   at least the second portion of the closure having an outer plastic layer and an inner elastomeric layer;
   said first portion including a means for holding said closure firmly to said container;
   said second portion including an outlet for a fluid that may be contained within said container and a valve means for permitting air to enter said container to replace fluid flowing out of said container through said outlet;
   said valve means including internal walls in said elastomeric layer defining a valve opening and an integrally formed flap extending from said layer and being of the same material as the layer;
   said flap being sufficiently close to said valve opening to close said valve opening when forced against the layer surrounding said valve opening;
   said means for holding said closure to said container including a plurality of threads formed of an elastomeric material, whereby said threads may be removed from a mold part by deforming to permit said closure to be pulled laterally from the mold part;
   said outer plastic layer having an inner surface formed to fit over said inner elastomeric layer of said second portion and having a pin extending downwardly through said valve opening; and
   said outer plastic layer and said inner elastomeric layer being formed of materials that are releasable from one another when molded together.

2. A nursing container comprising the combination of a bottle with the combination of claim 1 in which:
   said closure further comprises a second outer plastic layer separated from said first-mentioned outer plastic layer and extending around said first portion to form a protective shank over said elastomeric thread for said closure;
   said second portion of closure includes a nipple formed in said elastomeric layer; and
   said bottle includes an externally threaded neck engaged with the elastomeric threads of said closure.

3. A nursing container according to claim 2, in which:
   said valve means includes a recess in said inner elastomeric layer of said second portion surrounding said valve opening;
   said flap being loosely held within said recess by said bottle.

4. A closure for a fluid container comprising:
   first and second portions;
   said first portion including a means for holding said closure firmly to a container;
   said second portion including an outlet for fluid within said container and a valve means for permitting air to enter said container to replace fluid flowing out of said container through said outlet;
   said first and second portions comprising an outer plastic layer and an inner elastomeric layer;
   said outer plastic layer having an inner surface formed to fit over said inner elastomeric layer;
   said valve means including a valve opening;
   said outer plastic layer including integrally formed pins extending downwardly through said valve opening and said outlet;
   said outer plastic layer and said inner elastomeric layer being formed of materials that are releasable from one another when molded together; and
   said second portion of said closure including a nipple formed in said elastomeric layer.